June 11, 1963  J. R. MENKE  3,093,563
COMPOSITE NEUTRONIC REACTOR
Filed April 30, 1953  9 Sheets-Sheet 1

INVENTOR
John R. Menke
BY
Roland A. Anderson
ATTORNEY

June 11, 1963 J. R. MENKE 3,093,563
COMPOSITE NEUTRONIC REACTOR
Filed April 30, 1953 9 Sheets-Sheet 2
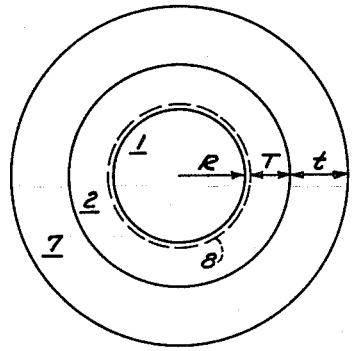
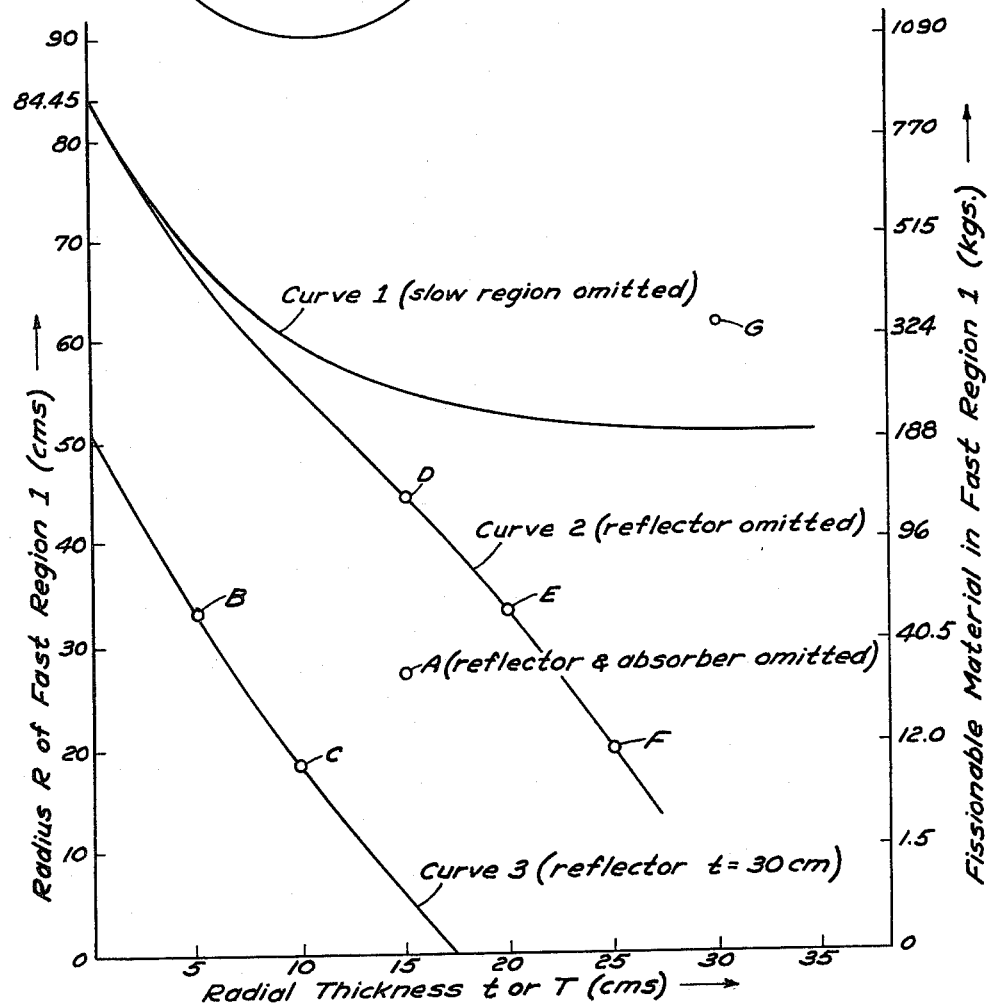

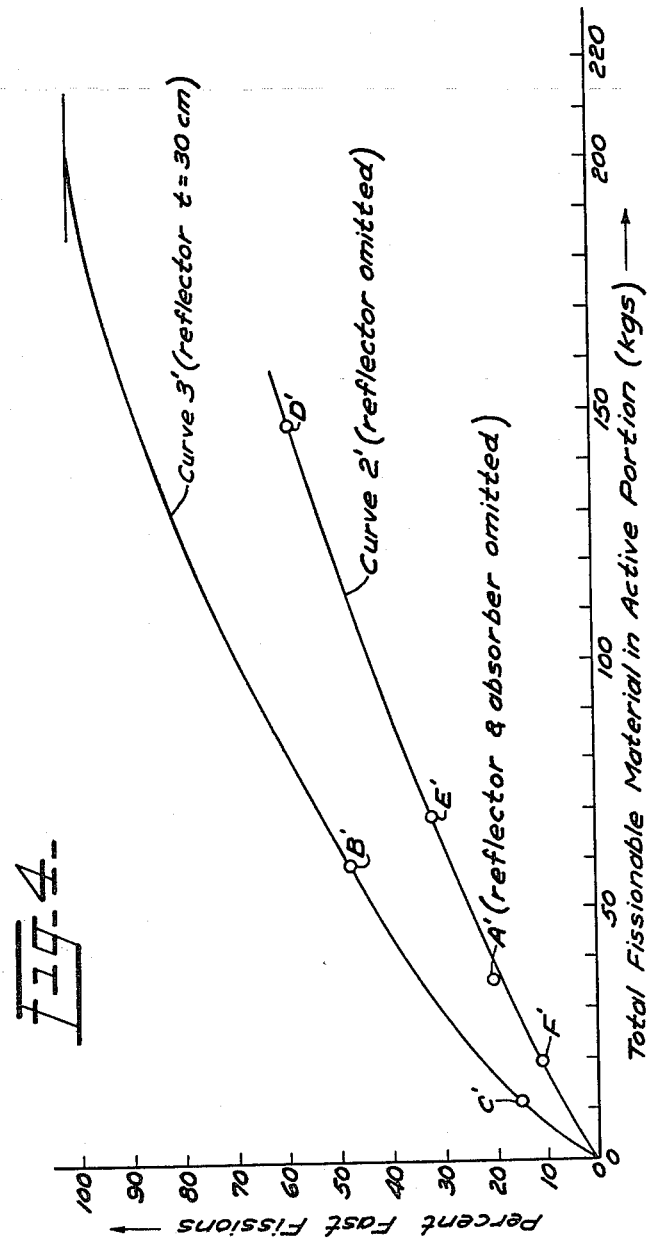

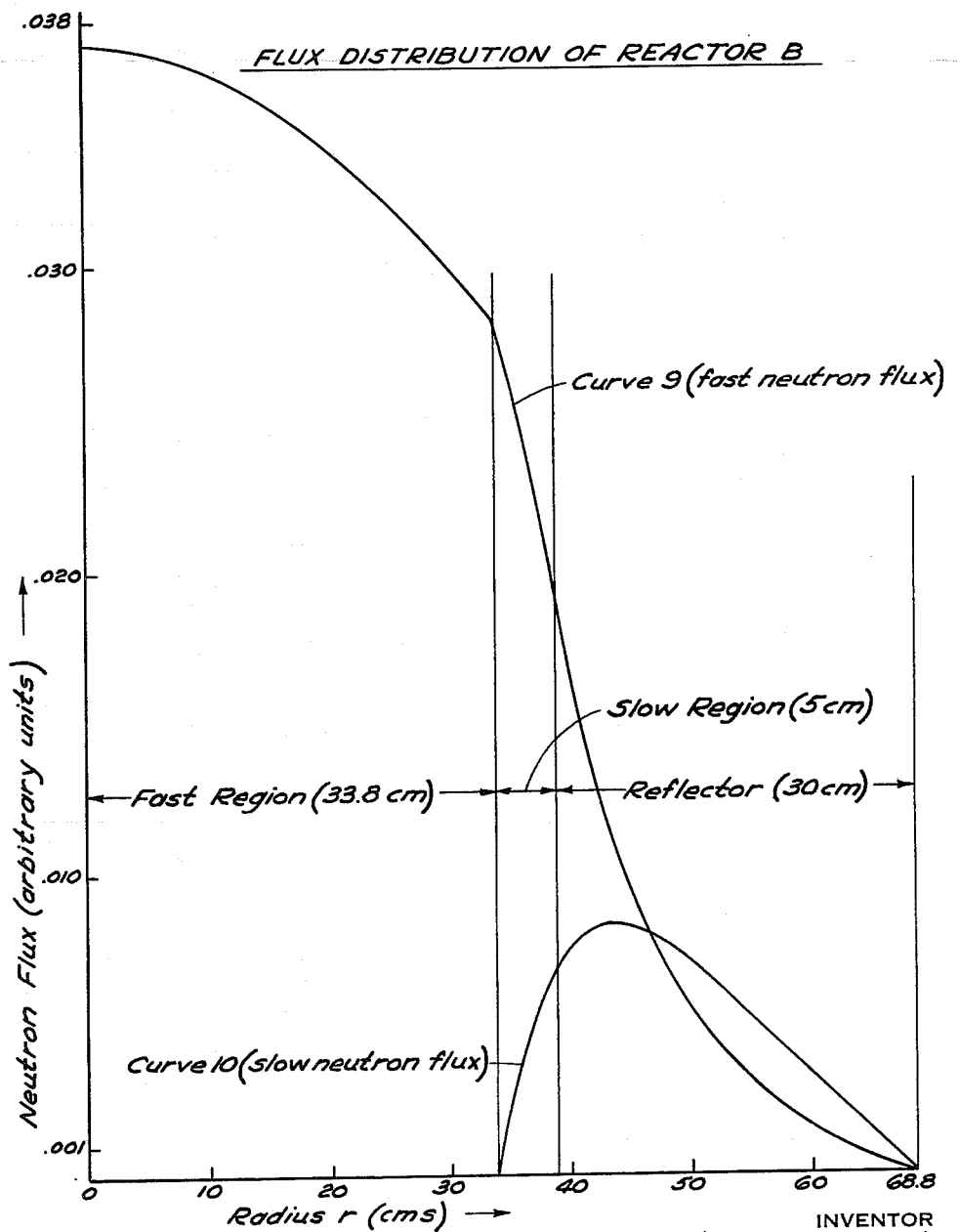

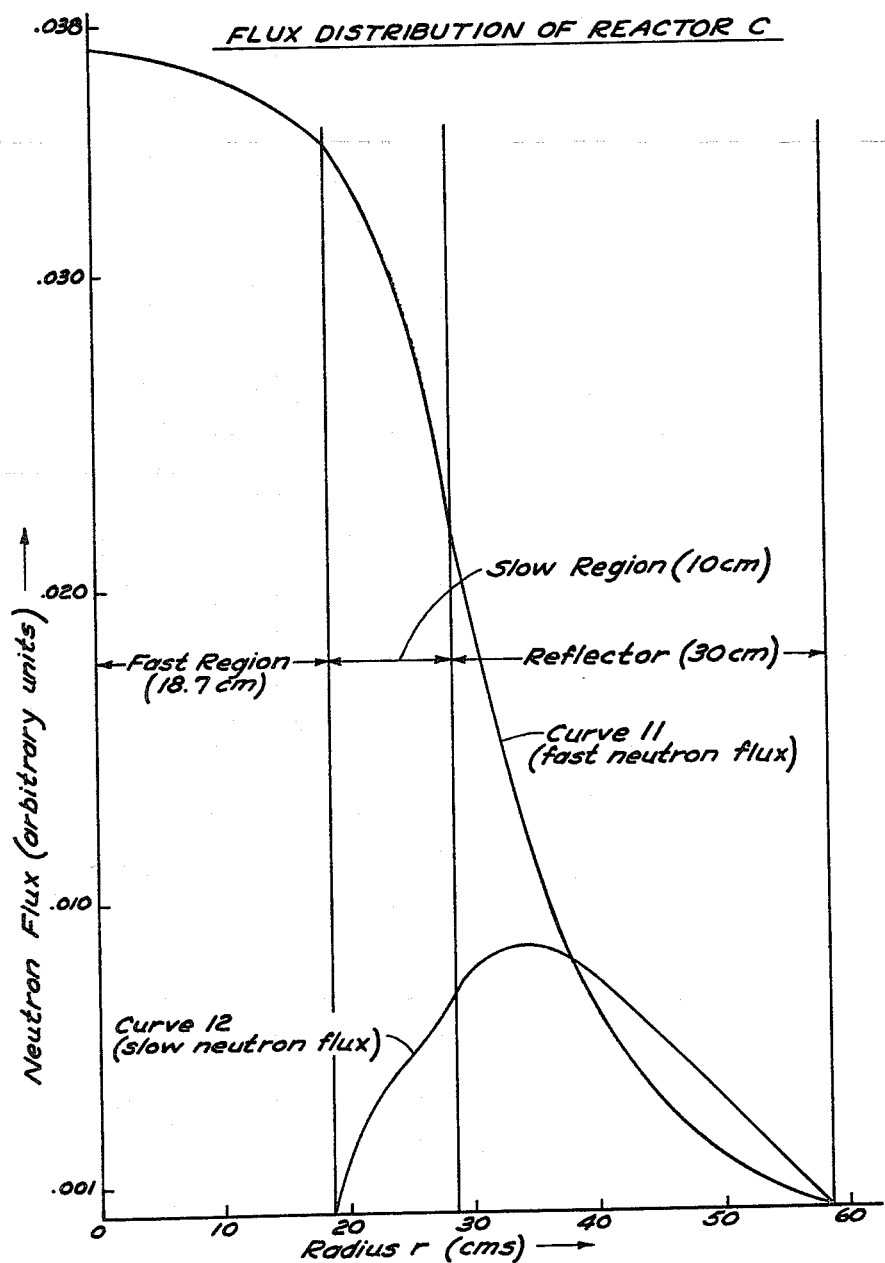

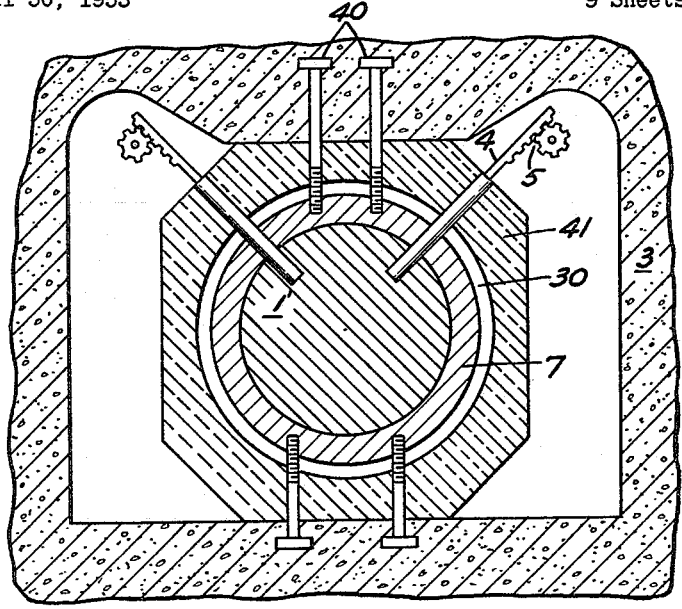
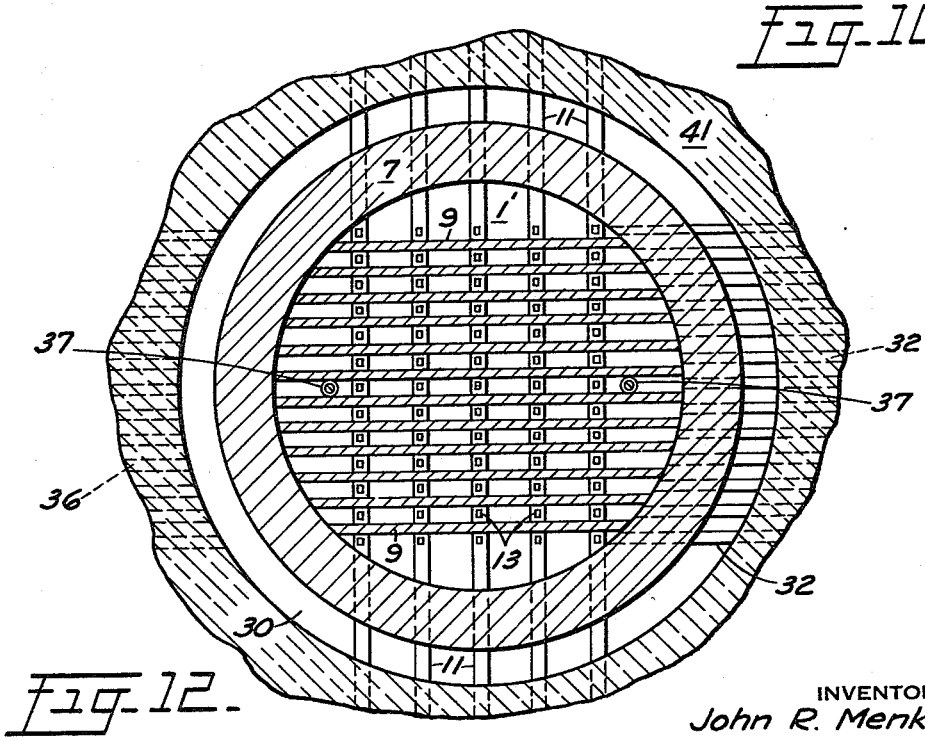

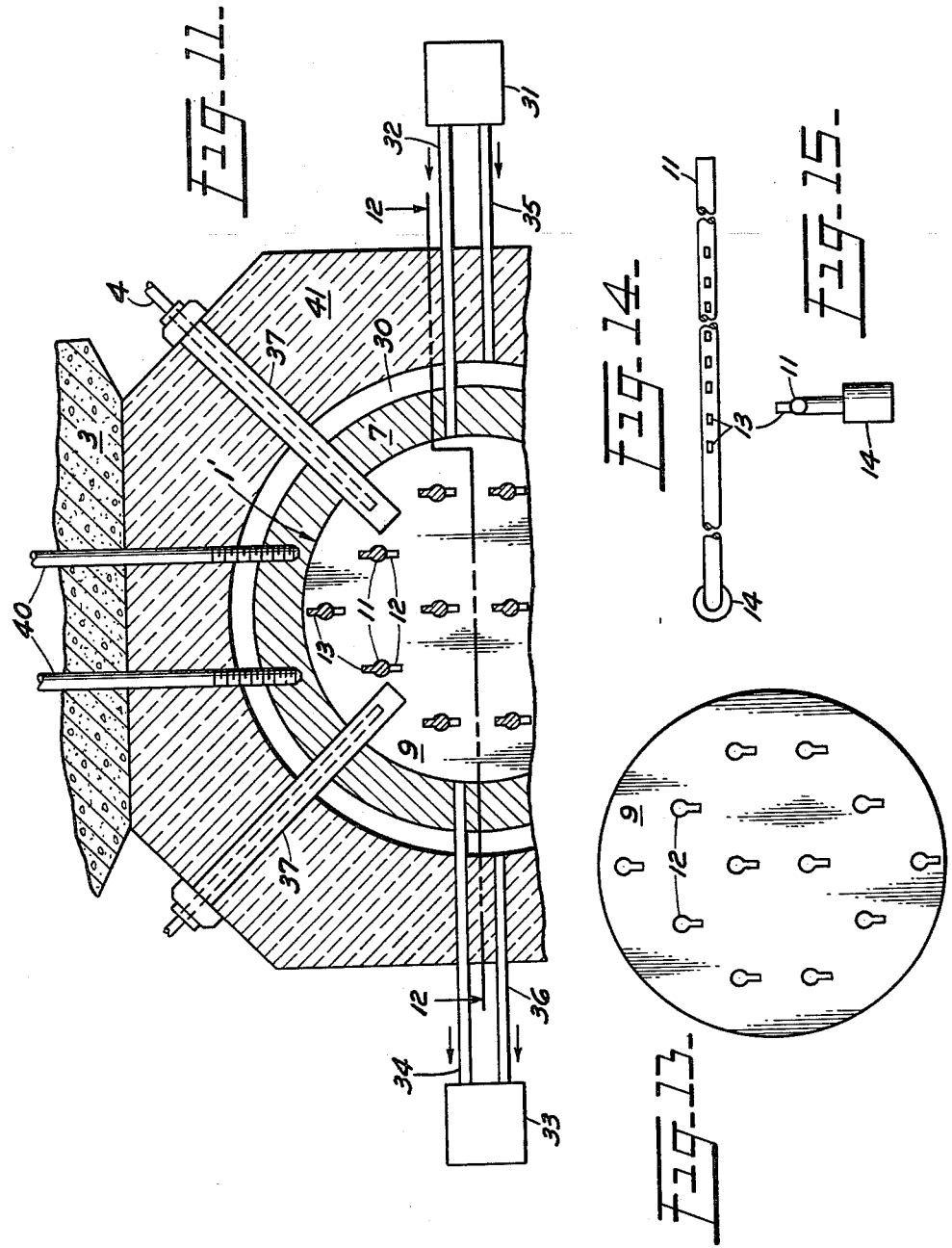

3,093,563
COMPOSITE NEUTRONIC REACTOR
John R. Menke, Scarsdale, N.Y., assignor to the United States of America as represented by the United States Atomic Energy Commission
Filed Apr. 30, 1953, Ser. No. 352,166
4 Claims. (Cl. 204—193.2)

This invention relates generally to the neutronic reactor art and it is particularly concerned with a basically novel type of reactor having associated therewith unique sets of performance characteristics not heretofore available to the reactor designer.

As used in this specification and in the appended claims, the following terminology is defined as indicated below:

Thermal Neutrons—Neutrons having a substantially Maxwellian number-energy distribution characteristic about an energy value equal to $kT$, where $k$ is a constant and T is the temperature in degrees Kelvin ($kT=0.025$ electron volts at 15° C.).

Slow Neutrons—Neutrons having a kinetic energy less than one electron volt.

Fast Neutrons—Neutrons having a kinetic energy greater than 100,000 electron volts.

Intermediate Neutrons—Neutrons having a kinetic energy in the range between that of fast neutrons and that of slow neutrons.

Reactor Active Portion—That inner portion of a neutronic reactor which contains fissionable material and is characterized by a multiplication constant ($k$) greater than unity. The symbol ($k_\infty$) is sometimes employed in the literature to represent the multiplication constant ($k$).

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Fertile—Having the ability to convert to fissionable material upon the absorption of a neutron.

Moderator Material—A non-gaseous material for which the ratio $\xi\sigma_s\sigma_a$ is greater than 10, wherein $\xi$ is the average loss in the logarithm of the energy of a fast neutron per elastic collision within the material, $\sigma_s$ is the thermal neutron elastic scattering cross section per atom of the material, and $\sigma_a$ is the thermal neutron absorption cross section per atom of the material.

Slow Neutron Absorber—An atomic nucleus having a thermal neutron absorption cross section greater than one hundred barns.

Diluent Material—Any non-fissionable material present in the active portion of a neutronic reactor.

Dilution—The ratio of diluent atoms to fissionable atoms in an active portion of a neutronic reactor.

Breeding Gain—The net gain in the number of fissionable atoms per fissionable atom destroyed.

Specific Power—Kilowatts heat output of the reactor per kilogram of fissionable material present in the active portion.

Doubling Time—The time required to double the initial inventory of fissionable material present in the active portion.

As is now well known, by massing together sufficient fissionable material under appropriate conditions, a self-sustaining neutron reactive assemblage may be formed, with assemblage, by reason of its ability to generate neutrons at an equal or greater rate than they are being lost thereto by absorption or leakage, is capable of maintaining a self-sustained chain reaction of neutron induced fission. Apparatus which employs such a neutron reactive assemblage has been termed a neutronic reactor, nuclear reactor, or "pile." A detailed description of the theory and practice of the design, construction, and operation of reactors generally is set forth in the Science and Engineering of Nuclear Power, Addison Wesley Press, Inc., Cambridge, Massachusetts, vol. 1 (1947) and vol. 2 (1949) and in Elementary Pile Theory, H. Soodak and E. C. Campbell, John Wiley and Sons, New York, 1950. Reference is made particularly to chapters 4, 5, 6, 8 and 9 of Goodman vol. 1. Any terminology not specifically defined herein is used in the sense defined on pages 112 to 115 of Goodman, vol. 1.

As is known, the active portion of such reactors may be homogeneous or heterogeneous, that is, it may comprise simply a homogeneous neutron reactive composition, or it may comprise a neutron reactive lattice formed of a multitude of identical heterogeneous structural arrangements or cells.

As indicated on page 99 of vol. 1 of the above-mentioned Goodman publication, there is associated with any given neutron reactive system (composition or lattice) a characteristic multiplication constant ($k$), which, in the homogeneous case, depends only upon the particular materials used and their relative abundance, and, in the heterogeneous case, depends also upon the particular geometry and dimensions of the representative cell of the lattice. The multiplication constant may be thought of as a measure of the reactivity of the particular reactive system (composition or lattice).

In an entirely analogous manner, there is associated with any particular neutron reactive system (composition or lattice) a characteristic neutron energy level at which the fissions inherently tend to occur. Thus, if any particular reactive system were imagined to be extended infinitely, and a plot were made of number of fissions as a function of the energy of the neutrons inducing these fissions, there would result a curve having a maximum at some one particular energy level and falling off steadily and rather rapidly on both sides of the maximum. Because of the rapid falling off of the curve on both sides of the maximum, substantially all of the fissions would occur within a fairly narrow energy region on both sides of the energy at which the maximum number occurs. The neutron energy at which the maximum would occur for any particular system (composition or lattice) is herewith defined as the inherent characteristic energy level of that system. Thus, any given reactive system (composition or lattice) is energy classifiable as fast, intermediate, or slow depending upon whether its inherent characteristic energy level lies in the fast, intermediate, or slow energy range.

Physically, it can readily be seen that in any neutron reactive system, a continuous process of competition is taking place between the slowing down of the high energy fission produced neutrons and the capture thereof in the fissionable or diluent atoms. Accordingly, the relative abundance of fissionable material and diluent material, and the slowing down ability of the diluent material, are the two factors which principally determine the characteristic energy level of such a system. The inherent characteristic energy level of any particular reactive system is entirely definite, and it may be computed by the application of known principles of reactor physics, or it may be experimentally determined by known techniques.

In most previously constructed or proposed reactors, the reactive system (composition or lattice) was uniform throughout the volume of the active portion of the reactor. In those cases where this was not true, that is, where different reactive systems were employed in different spatial regions of the active portion, the different systems, nevertheless, did possess substantially identical neutron energy characteristics. Thus, even in these latter cases, the characteristic energy level was substantially uniform throughout the volume of the active portion of prior reactors, and accordingly, the entire active portion could be considered as having a single characteristic energy level equal to that of its component reactive systems.

Moreover, in the design of prior reactors, care has always been taken not to employ a type of neutron reflector which was inconsistent with the neutron energy characteristic of the immediately enclosed active portion. Thus, reflectors intended for use with an active portion having a fast neutron energy characteristic were always formed of high atomic weight material instead of moderator material, in order that fast leakage neutrons would not be slowed down in the reflector and returned to the active portion as slow neutrons. Accordingly, the actual operating neutron energy level of all prior reactors was substantially identical with the inherent characteristic energy level of the reactive system employed as the active portion of the reactor.

From the foregoing, it can be seen that for all prior reactors, a maximum number of fissions occur at a particular energy level (the inherent characteristic energy level of the reactor active portion), that the number of fissions occurring at different energy levels falls off rapidly to either side of the level at which the maximum number occurs, that substantially all of the fissions occur within a fairly narrow energy region on both sides of the level at which the maximum number occurs, and that the relationship between the number of fissions and the energy at which the fissions are induced is substantially uniform and constant throughout the volume of the reactor active portion. This has led to an energy classification of prior reactors as fast, intermediate, or slow, depending upon whether the majority of fissions occur in the fast, intermediate, or slow energy range. Examples of each of these three types of reactors are given in Goodman, vol. 1, chapter 9; in the drawings on pages 304, 308, 318, and 320 of Goodman, vol. 1, typical curves of number of fissions as a function of the energy of the neutrons inducing the fissions for each of these types of reactors are illustrated.

In the past, each of these three energy classifications of reactors has had associated with it a fairly unique set of operating or performance characteristics. In other words, a fast reactor had advantages in certain respects and disadvantages in other; similarly for intermediate (resonance) and slow reactors. Furthermore, contrary to what might be expected, the intermediate reactor, in general, did not represent an intermediate position in all respects between the performance characteristics of the fast and slow reactors, but rather had its own unique set of characteristics, which might, in respect to a particular performance characteristic, be either better or worse than either of the other types. In general, and assuming plutonium-239 as the fissionable material for the sake of uniformity, the relative performance characteristics heretofore obtainable in well designed high performance reactors of the three types are indicated in the following tabulation:

intermediate reactors by dilutions in the hundreds, and fast reactors by dilutions in the tens or less. Since the maximum specific power obtainable corresponds roughly to the degree of dilution, slow reactors yielded the highest specific power and fast reactors the least specific power. Vulnerability to damage from the fast fission neutrons is naturally least in the most dilute reactors, that is slow reactors, and greatest in the fast reactors. For various reasons, as brought out in U.S. patent application No. 698,334 for Reactor, filed in the name of L. Szilard on September 20, 1946, fast reactors exhibit the highest breeding gain. It turns out that the breeding rate, which is proportional to the product of specific power and breeding gain, its probably highest for fast reactors and probably least for intermediate reactors. As would be expected, slow reactors are highly temperature sensitive and fast reactors least temperature sensitive. Slow reactors are very readily controlled by the introduction and withdrawal of control rods containing slow neutron absorbers. Prior fast reactors, being essentially devoid of slow neutrons, could not be controlled in this manner, and more cumbersome and/or less sensitive methods of control had to be employed. In a similar manner, the complications introduced into the design and operation of slow reactors by virtue of the enormous thermal neutron absorption cross section of certain fission products, notably Xe-135, have not heretofore been present at all in fast reactors. Finally, fast reactors were inherently much more dangerous than slow reactors by virtue of the very small average neutron lifetime, and their consequent small pile period should the reactor ever become critical on prompt neutrons alone. The mean neutron lift time in conventional fast reactors is of the order of $10^{-7}$ seconds as compared to about $10^{-3}$ seconds in slow reactors. It should also be mentioned that in the past, a fast reactor of sufficient dilution to provide a reasonably satisfactory specific power, say 4000 kw./kg., has had to have an extremely high critical mass of fissionable material, say a few hundred kilograms, whereas slow reactors could readily be designed to provide a specific power of say 10,000 kw./kg. with a critical mass of the order of ten kilogram of fissionable material.

It will be apparent therefore that these inherent operating characteristic heretofore represented a severe limitation on the reactors designer's freedom of choice insofar as ultimate performance characteristics are concerned. The designer had to select that energy type of reactor whose performance characteristics most nearly conformed to desired performance characteristics, and he then had to accept the disadvantages inherent in the selected type. As an outstanding example, if the designer was most interested in obtaining the highest possible breeding gain, the selection of a fact reactor would be indicated. Having selected a fast reactor, he would be faced with a difficult control problem due not only to the fact that he could not use absorber type control, but also to the greater inherent habard of a fast reactor arising from its very small prompt critical period.

It is the general object of the present invention, therefore, to provide novel types of reactors having associated

| Performance characteristic | Slow reactor | Intermediate reactor | Fast reactor |
| --- | --- | --- | --- |
| Dilution | Highest | Intermediate | Least. |
| Specific power | do | do | Do. |
| Breeding gain | Intermediate | Least | Highest. |
| Breeding rate (specific power × breeding gain) | Probably intermediate | Probably least | Probably highest. |
| Vulnerability to fission damage | Least vulnerable | Intermediate | Most vulnerable. |
| Temperature coefficient of reactivity | Highest | do | Least. |
| Adaptability to absorber type of control | Best | Barely | Not at all. |
| Inherent danger | Least | Intermediate | Highest. |
| Complications introduced by xenon build-up | Worst | Hardly any | None. |

In brief explanation of the above table, previous slow reactors were characterized by dilutions in the thousands, therewith sets of performance characteristics which differ from those previously available, as set forth above, to thereby provide the reactor designer with a greater degree of flexibility in respect to ultimate performance characteristics.

Another general object of the present invention is to provide means for modifying the performance characteristics previously thought to be inherent in fast, intermediate and slow reactors, respectively.

Still another general object of the present invention is to provide means for effecting in a single reactor a compromise between the operating characteristics previously thought to be inherent in fast, intermediate, and slow reactors, whereby, for example, certain of the advantageous characteristics of fast and slow reactors can be simultaneously realized.

Still another object of the present invention is to provide a reactor wherein a substantial percentage of the fissions is induced by slow neutrons and a substantial percentage is induced by fast neutrons.

Still another object of the invention is to provide a reactor wherein the actual operating energy level differs substantially from the inherent characteristic energy level of the active portion.

Another object of the present invention is to provide a fast reactor which is inherently less dangerous than previous fast reactors and which can be controlled by means of the insertion and withdrawal of a slow neutron absorber.

Another object of the present invention is to provide a high performance fast reactor having a smaller critical mass than previous fast reactors of comparable performance characteristics.

Still another object of the invention is to provide a research and experimental reactor having two irradiation regions, one of which is permeated by a high fast neutron flux and the other of which is permeated by a slow neutron flux.

These and other objects of the invention will become apparent from the following detailed description when taken in connection with the accompanying drawings, wherein.

Figure 2:
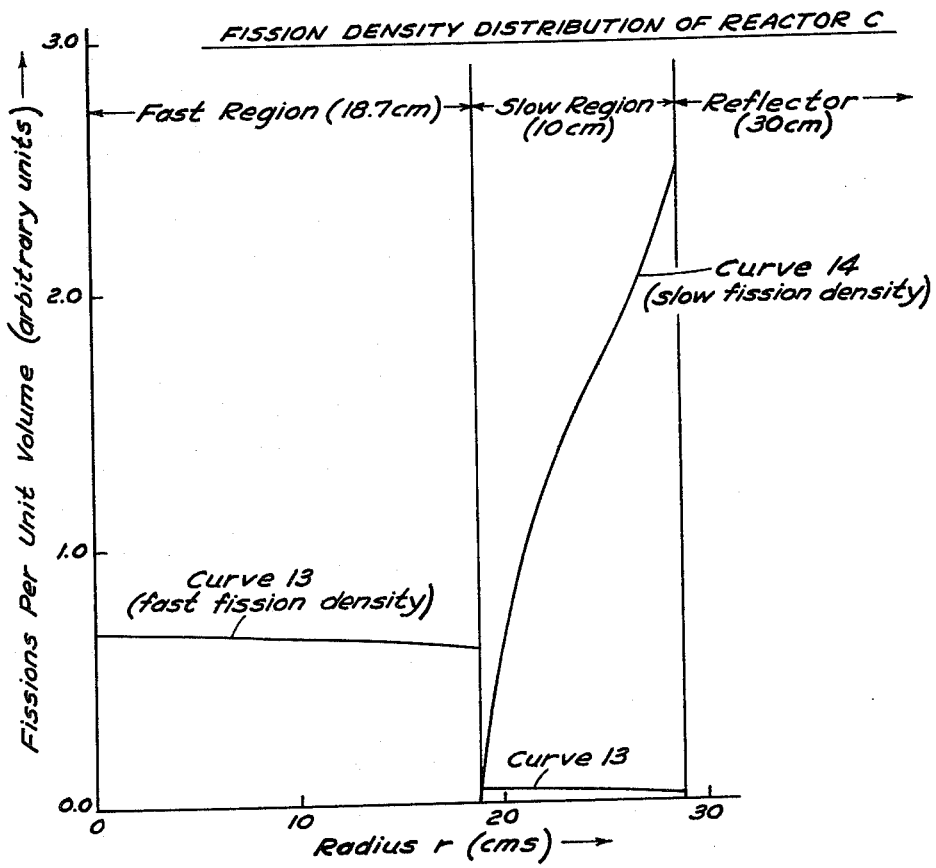
FIG. 2 is a schematic representation of the first region, slow region, and moderator reflector of an infinite number of reactors of varying dimensions, this fig. being useful as a reference base in the discussion of the curves of FIGS. 3 to 9.
Figure 8:
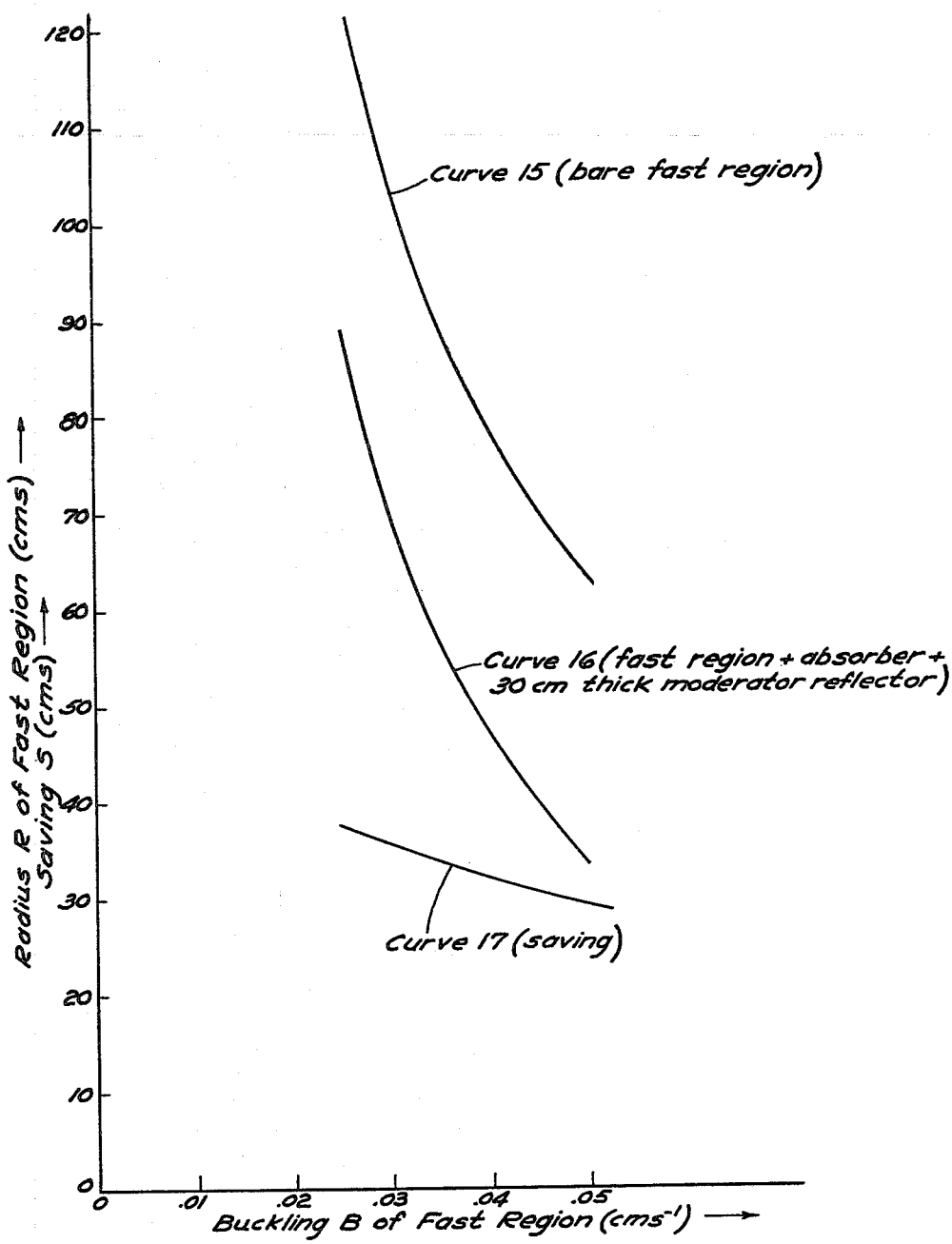
Figure 9:
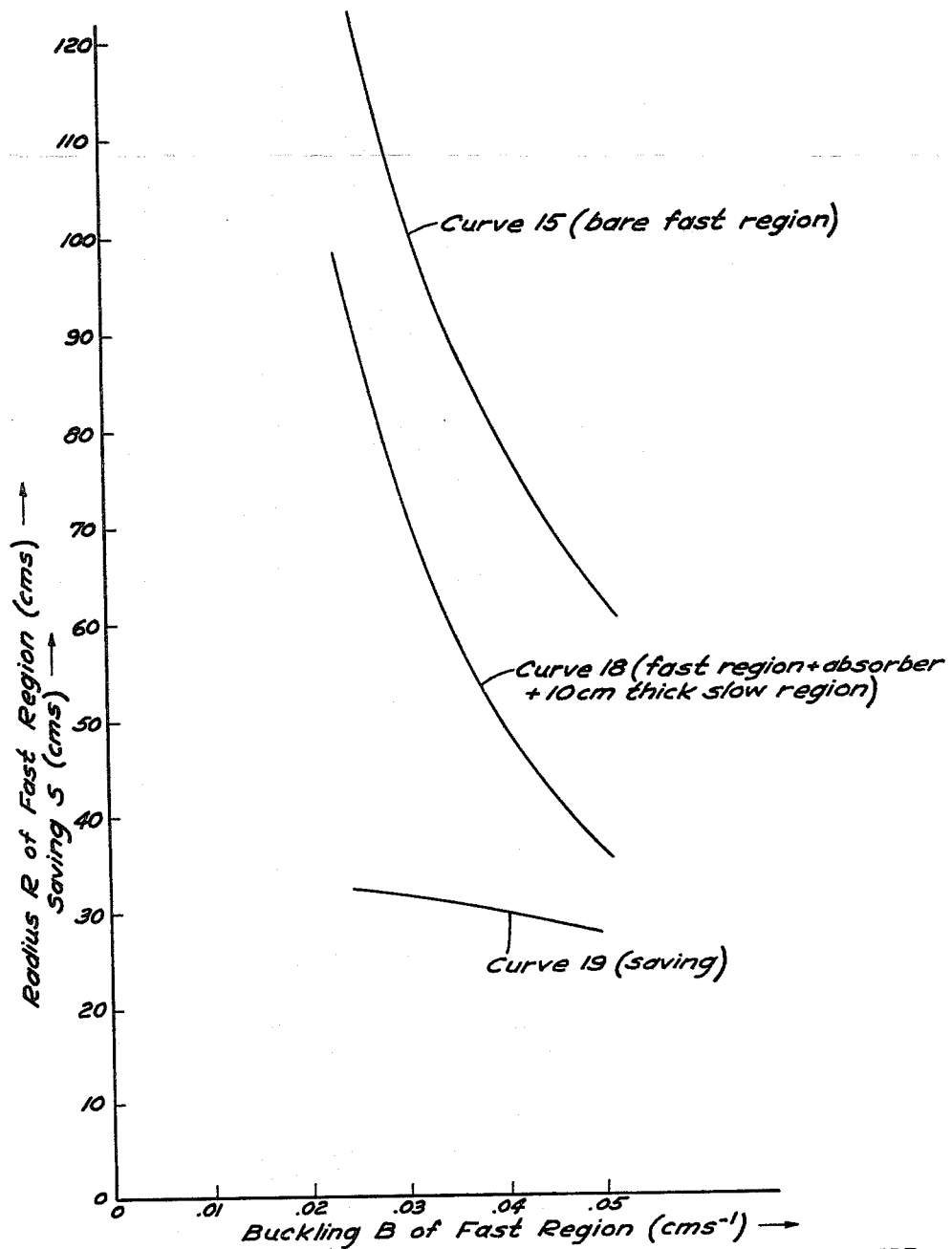

FIG. 3 constitutes a group of curves showing the dependence of the radius and fissionable material content of the fast region of FIG. 2 upon the dimensions of the slow region and reflector;

FIG. 4 constitutes a group of curves showing the variations of the overall fissionable material content of the reactors of FIG. 2 with the percent fast fissions;

FIG. 5 shows the fast and slow neutron flux distribution for a specified example of the reactors of FIG. 2;

FIG. 6 shows the fast and slow neutron flux distribution for another specified example of the reactors of FIG. 2;

FIG. 7 shows the fast and slow fission density distribution for said other specified example;

FIG. 8 constitutes a group of curves illustrating, for fast active regions of varying compositions, the reduction in fast region radius which is affected by immediately surrounding said region with a moderator reflector;

FIG. 9 constitutes a group of curves illustrating, for fast active regions of varying composition, the reduction in fast region radius which is effected by immediately surrounding said region with a slow active region;

FIG. 10 is a sectional elevation view of one specific embodiment of the present invention which is particularly useful as a power producing and breeding reactor;

FIG. 11 is an enlarged fragmentary sectional elevation view of the upper portion of a reactor, such as that indicated in FIG. 10, illustrating a cooling system associated therewith;

FIG. 12 is a horizontal sectional view taken along the lines 12—12 of FIG. 11;

FIG. 13 is a side elevation view of one of the fissionable material containing plates shown in FIG. 11;

FIG. 14 is a plan view of one of the plate retainer rods shown in FIG. 11; and

FIG. 15 is an end view of the rod shown in FIG. 14.

In accordance with the broad principles of the present invention, the active portion of a neutronic reactor is caused to be spatially non-uniform in respect to its actual operating neutron energy level, that is, the active portion is effectively divided into two or more spatially discrete regions in each of which the maximum number of fissions occurs at substantially different energy levels. In this manner, the reactor designer is completely freed from what was previously considered a necessary limitation to the particular shape of fission-energy spectrum curve illustrated on page 304 of Goodman, vol. 1, that is, a curve having a single maximum and falling off steadily and rather sharply on both sides of the maximum, and he may instead, by appropriate design, construct a reactor having almost any desired shape of fission energy spectrum curve. For example, a reactor constructed according to the principles of the present invention may have a substantial percentage of its fissions occurring in the fast energy range and a substantial percentage of its fissions also occurring in the slow energy range, and its fission-energy spectrum curve may, for example, have two or more maxima with valleys in between, or it may, for example, be substantially flat over the entire energy range.

This spatial non-uniformity in respect to actual operating energy level of the active portion may be effected in two different ways: (1) the active portion, itself, may be actually divided into two or more active regions differing from one another in their respective inherent characteristic energy levels, or (2) the active portion may be spatially uniform in respect to its inherent characteristic energy level, and at least a part thereof may be externally induced to operate at a substantially lower energy level through the influence of a reflector which substantially lowers the energy of entering leakage neutrons before reflecting them back into the active portion.

Figure 1:
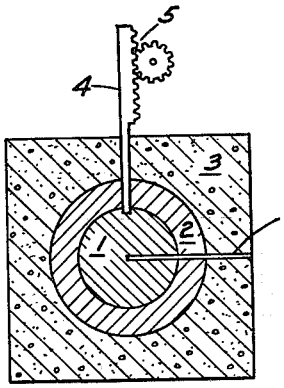
FIG. 1 is a sectional elevation view of a simple low power reactor embodying the principles of the present invention and adapted particularly to research and experimental use.

The first of these methods is utilized in the reactor illustrated in FIG. 1 and the second of these methods is utilized in the reactor illustrated in FIGS. 10 to 15.

Applicant desires to stress at this point that the invention is directed broadly to the basic nuclear physics aspects of reactor design and is not concerned with details of construction. Thus, the principles of the invention are equally applicable to a homogeneous or a heterogeneous type reactor, and to a cooled or uncooled reactor.

In order that the basic principles of the invention may most readily be understood, they are embodied in FIG. 1 in a very simple form of reactor, that is, an uncooled low power low temperature reactor, such as would be useful in universities, for example, for research, experimental, and educational purposes. As there shown, and in accordance with the preferred application of the principles of the present invention, the active portion or core, which contains the fissionable material and which supports the chain reaction, consists of an inner active region 1 having an inherent characteristic energy level lying in the fast range and an outer active region 2 having an inherent characteristic energy level lying in the slow range. The reactive system of region 1 therefore contains fissionable atoms, such as U-235, U-233 or Pu-239, and is essentially free of moderator atoms i.e., has a low ratio of moderator to fuel atoms, whereas the reactive system of region 2 contains fissionable atoms and moderator atoms in an atomic ratio of moderator to fissionable atoms sufficient, usually in the thousands, to give to the system an inherent characteristic energy level in the slow range i.e., has a high ratio of moderator to fuel atoms.

The active portion is surrounded by a radiation shield 3 of concrete, for example, in sufficient thickness to protect operating personnel from harmful emanations, such as neutrons and gamma rays emanating from the active portion. In the illustrated example of a low power reactor, a few feet of concrete is ample.

The power level of the reactor is controlled by a conventional control rod 4 movable in a vertical direction by means of a rack and pinion arrangement 5. The control rod is adapted to slide in a well extending through the shield 3 and slow region 2, and also extending, if desired, slightly into the fast region 1. So much of the lower portion of the control rod as lies within the active portion when the control rod is fully inserted, contains a slow neutron absorbing material in any convenient form. A circular rod a centimeter or two in diameter formed of cadmium or boron steel would provide a satisfactory control rod 4, for example.

The reactor may be interlaced with small irradiation channels, one of which is illustrated at 6, into which samples may be inserted at any desired position to be irradiated with neutrons for research or other purposes.

A specific example of one such research reactor, identified as reactor A, is given below:

EXAMPLE I

*Reactor A*

Fast region 1:
  Composition—homogeneous unitary solid mixture of Pu-239 and bismuth in an atomic ratio of 29 bismuth atoms per Pu-239 atom; density equals 10 gm./cm.$^3$; fissionable material density equals 0.357 gm./cm.$^3$.
  Shape—sphere.
  Radius—27.5 cm.
  Volume—87,000 cm.$^3$.
  Amount of fissionable material—31.1 kg.
Slow region 2:
  Composition—homogeneous unitary solid mixture of U-233 and beryllium in an atomic ratio of 2000 beryllium atoms per U-233 atom; density equals 1.85 gm./cm.$^3$; fissionable material density equals 0.024 gm./cm.$^3$.
  Shape—hollow sphere.
  Radial thickness—15 cm.
  Volume—234,000 cm.$^3$.
  Amount of fissionable material—5.61 kg.

The total fissionable material content of reactor A thus amounts to 36.71 kg. Since no provision for forced cooling is provided, the reactor would be operated at a low power level such that the maximum temperature attained at any point in the reactor is safely below the melting point of the materials of construction. The reactor could be operated at about 100 watts, for example, at which power level a slow neutron flux of about $2 \times 10^8$ neutrons/cm.$^2$/sec. and a fast neutron flux of about $4 \times 10^9$ neutrons/cm.$^2$/sec. would be available for irradiations and experimental purposes.

It will be apparent that reactor A represents a very unique composite reactor wherein region 1 of the active portion tends to support a chain reaction of fast neutron induced fissions i.e., has a $k$ infinity greater than one and region 2 of the active portion tends to support a chain reaction of slow neutron induced fissions i.e., has a $k$ infinity greater than one, and neither of the regions, by itself, is capable of supporting a self-sustaining chain reaction i.e., has a $k$ effective of one or more. There results a reactor wherein a substantial percentage of the fissions are induced by fast neutrons, and a substantial percentage of the fissions are induced by slow neutrons, and only a small percentage of the fissions are induced by intermediate energy neutrons. Thus, a plot for the reactor, as a whole, of the number of fissions as a function of the energy of the neutrons inducing the fissions would have a maximum in the fast energy range and another maximum in the slow energy range and a connecting valley in the intermediate energy range. In reactor A, approximately 80 percent of the fissions are caused by slow neutrons, substantially all of the remainder being caused by fast neutrons.

The fast neutron flux will be a maximum at the center of region 1 and will fall off rather slowly with increasing radius until region 2 is reached at which point it will fall off much more rapidly with increasing radius. The slow neutron flux will have a maximum at a point in region 2 between the middle of region 2 and the interface between the two regions, and it will continuously fall off on both sides of the maximum. The slow neutron flux will begin to fall off much more sharply with decreasing radius at the interface between the two regions and will have been reduced to a negligible value at the center of region 1. Thus, substantially all of the fast fissions will take place in region 1, very few occurring in region 2. Substantially all of the slow fissions will occur in region 2 and in a small layer at the outer boundary of region 1, very few occurring in the remainder of region 1. (Since region 1 has a much higher concentration of fissionable material than does region 2, slow neutrons diffusing across the interface and into region 1 are even more efficient in producing fission than those in region 2. Thus, there occurs a local rise in slow fission density in the outer boundary layer of region 1. This results in a corresponding local rise in power per unit volume in this portion of region 1, about which more will be said hereinafter.)

It will be apparent, therefore, that reactor A is spatially non-uniform in respect to its actual operating neutron energy level, being effectively divided into an inner and an outer zone having different neutron energy operating characteristics, the inner zone comprising region 1 exclusive of the aforesaid boundary layer, and the outer zone comprising the boundary layer of region 1 and all of region 2. At each point in the inner zone, the maximum number of fissions occurs at fast energies, whereas at each point in the outer zone, the maximum number of fissions occurs at slow energies.

Reactor A has several marked advantages as a research and experimental tool over reactors heretofore available for such purposes, since it, in effect, combines a fast and slow reactor in one machine. Thus, the research investigator has access through channel 6 to a portion of the reactor which is operating essentially on fast neutrons or to one which is operating essentially on slow neutrons. As desired, he can irradiate a specimen at the center of the fast region 1 where the ratio of fast neutron flux to slow neutron flux is a maximum, or at the point in the slow region 2 where the ratio of slow neutron flux to fast neutron flux is a maximum, or at a point close to the interface between the two regions where there exists simultaneously a substantial fast neutron flux and a substantial slow neutron flux.

Another advantage of particular value in connection with the use of reactor A in educational institutions is that it makes available to such institutions a reactor which exhibits many of the characteristics and attributes of a fast neutron reactor, but which does not have associated with it the inherent danger, difficult control problems, and high fissionable material requirements which militate strongly against the construction and use of conventional fast neutron reactors by such institutions. These advantages arise from the fact that the reactor relies, in part, on slow neutron fissions for sustenance of the chain reaction.

To the extent that it does so rely on slow neutron fissions, the mean neutron lifetime is increased from the value of about $10^{-7}$ seconds, the lifetime in fast reactors, and approaches the value of $10^{-3}$ seconds, the lifetime in slow reactors. Since the rate of increase of the reactor power level in the event that the reactor ever becomes critical on prompt neutrons alone is inversely proportional to the mean neutron lifetime, the means neutron lifetime may be taken as an inverse measure of the inherent danger of the reactor.

As to the control problem, itself, conventional fast reactors are not susceptible to control by the simple technique of variable insertion of a slow neutron absorber, and more difficult and cumbersome, and less sensitive, control techniques, such as the variable removal of fissionable material or variable displacement of discrete portions of the reactor, must be restored to. However, as indicated above, reactor A is readily controllable by the variable insertion of the conventional slow neutron absorbing control rod 4 into the slow region 2 where the slow neutron flux is a maximum. If desired, and as indicated in FIG. 1, the control rod 4 may advantageously extend through the aforesaid outer boundary layer of the fast region 1 wherein the local rise is slow neutron fission density occurs.

As to the savings in fissionable material, a bare fast reactor having an active composition identical with that of region 1 of reactor A, would have a critical radius of 84.45 cm. and would require some 900 kg. of fissionable material. The critical radius and critical mass could be decreased to 61.54 cm. and 347 kg., respectively, by employing a bismuth reflector 30 cm. in radial thickness surrounding the active portion. As opposed to these extremely high values, the total fissionable material content of reactor A is 36.71 kg. Thus, it is seen that the provision of the slow region 2 around the fast region 1 in reactor A results in a saving in fissionable material of about 863 kg. over that required for the bare fast reactor and of about 310 kg. over that required for the fast reactor with bismuth reflector.

While the reactor of FIG. 1 illustrates the preferred application of the principles of the invention to a low power research reactor, it will be understood that the scope of the present invention admits of many variations, which still retain at least to some degree the advantages described. For example, while it is preferred that the disparity between the inherent characteristic energy levels of the two regions be as large as possible, that is, ranging all the way from fast to slow as in reactor A, the advantages may nevertheless be obtained to a somewhat lesser extent whenever two regions having substantially different inherent characteristic energy levels are employed. In order for the advantages to be appreciable, however, the inherent characteristics energy levels of the two regions should differ from one another by at least an order of magnitude, and preferably by several orders of magnitude. Thus, for example, regions 1 and 2 might have inherent characteristic energy levels of say 2.5 and 0.025 electron volts, respectively.

Also, while it is preferred that the inherent characteristic energy level of that region which has the lowest inherent characteristic energy level lie in the slow range in order that slow neutron absorber type control may be employed, this is not necessary. Thus, for example, regions 1 and 2 might have inherent characteristic energy levels of say $10^6$ and $10^4$ electron volts, respectively. Satisfactory control of such a reactor could be obtained by substituting fissionable material for the slow neutron absorber contained in the lower portion of control rod 4 of FIG. 1.

It will also be apparent that the relative positions of regions 1 and 2 could be reversed, that is, the inner region could have a slow characteristic energy level and the outer region a fast characteristic energy level. In such case, provision would be made for inserting the control rod well into the slow inner region.

Finally, it is, of course, obvious that instead of only two regions having different characteristic energy levels, three or four discrete regions, or as many as desired, may be employed, each having its own individual inherent characteristic energy level. In other words, the inherent characteristic energy level may progress more gradually along the radius of the active portion. The change in inherent characteristic energy level with radius could even be continuous, if desired, corresponding to an infinite number of regions, although such an extreme case would not only be unnecessary, but also difficult to construct as a practical matter.

It is contemplated that any conventional improvements may be made in reactor A if such are deemed to warrant the additional complication and expense entailed thereby in any given application. For example, a reflector of moderator material could obviously be placed immediately around the slow region 2, thus reducing the amount of fissionable material required. Provisions for cooling the reactor could be made, if desired, to permit operation at higher power levels.

While, in the interests of clarifying the basic reactor physics involved, the principles of the invention have in the foregoing description been illustrated as applied to a low power research reactor, these principles have a more important application in high power force cooled reactors employed for the production of power and/or for the production of fissionable nuclei or other especially desired nuclei by the absorption of excess neutrons in a nucleus of lower atomic weight. FIGS. 2 through 9 are intended to teach how the principles of the invention may be applied to such high power reactor and to illustrate the nuclear physics characteristics, dimensions, and fissionable material requirements of the reactors which result.

FIG. 2 is a schematic representation of the active portion and reflector of an infinite number of reactors of varying dimensions, this fig. being used as a reference base in the discussion of the curves of FIGS. 3 to 9.

Referring now to FIG. 2, reference numeral 1 represents a spherical fast region of radius R having an atomic composition identical to region 1 of reactor A. Reference numeral 2 represents a hollow spherical slow region of radial thickness T having an atomic composition identical to region 2 of reactor A. Reference numeral 7 represents a hollow spherical reflector of radial thickness $t$, and composed of pure beryllium having a density of 1.85 gm./cm.$^3$.

It will be noted that the values of atomic dilutions of regions 1 and 2 are consistent with operation at high power levels and at high levels of specific power. Thus, even in the fast region 1 where the fissionable material appears in its most concentrated form, the atomic dilution is sufficiently high (29 diluent atoms per fissionable atom) to permit operation at a specific power of a thousand kw./kg. or more.

It will be recalled that in the discussion of reactor A, it was indicated that there occurred along the outer boundary layer of region 1 a local rise in fission density and power density caused by diffusion of slow neutrons from the slow region 2 into the relatively high concentration of fissionable material in fast region 1. In reactor A, the power density at this point is about six times the power density at the center of region 1. While this is of no appreciable significance in a low power research reactor, such as reactor A, it should be disadvantageous in a reactor intended to operate at high power levels. This local rise in power density along the outer boundary of region 1 could be reduced somewhat by replacing the beryllium moderator employed in slow region 2 with a hydrogeneous moderator, such as water, which is relatively transparent to fast neutrons. In this manner, the point of maximum slow neutron flux could be pushed farther out into slow region 2, and the slow neutron flux along the outer boundary layer of fast region 1 thus reduced, thereby reducing the slow neutron fission density at this point.

However, for high power reactors it is advantageous to eliminate the local power density rise at the boundary of region 1, and this can be accomplished by inserting at the interface between regions 1 and 2 a thin layer of a slow neutron absorbing material to absorb all slow neutrons tending to enter region 1. A thickness of only about 0.5 cm. of pure boron, for example, is sufficient to absorb all but a very negligible portion of slow neutrons tending to diffuse into region 1, and such a boron layer can, therefore, be treated as a "black" absorber for slow neutrons. Reference numeral 8 of FIG. 2 represents such a thin black absorber for slow neutrons inserted at the interface between regions 1 and 2.

Referring now to FIG. 3, curve 1 represents a family of reactors, as indicated in FIG. 2, but with the slow region 2 omitted. The radius R and the fissionable material content of the fast region 1 are plotted as ordinates against the thickness $t$ of the reflector 7. It will be noted that at zero reflector thickness $t$ (corresponding to a bare fast reactor), a critical radius R of 84.45 cm. and a critical mass of some 900 kg. of fissionable material are required. As the reflector thickness increases, the critical radius and critical mass decrease sharply at first, and then more gradually, until a point is reached (at about $t=30$ cm.) where further thickening of the reflector has a negligible effect. With a reflector thickness $t$ of 30 cm., the critical radius has been reduced to 51.1 cm. and the critical mass of fissionable material to about 200 kg. Thus, it is seen that the addition of 30 cm. of the moderator reflector 7 effects a saving of some 700 kg. of fissionable material.

For comparison, point G on FIG. 3 represents a conventional fast reactor identical with the family of reactors represented by curve 1 except that a 30 cm. thick conventional fast reflector of bismuth has been substituted for the moderator reflector 7 of FIG. 2. The critical radius R of the fast region 1 for such a reactor is 61.54 cm. and the critical mass of fissionable material is 347 kg. Thus, substitution of 30 cm. of the moderator reflector 7 for the same thickness of bismuth reflector is seen to effect a saving in fissionable material requirement of some 147 kg.

The effect of immediately surrounding the fast region 1 by a moderator reflector instead of a non-moderating reflector is to lower the average energy of neutrons reflected back into the fast region. Although slow neutrons will be prevented from crossing back into the active region 1 by the black absorber 8, a large number of neutrons having energies in the intermediate range will be reflected back into the fast region 1, and will induce fissions therein. This will lower the actual operating energy level of the fast region, particularly in an outer zone thereof, and thus reduce the critical mass. In FIGS. 10 to 15 there is disclosed in detail a similar reactor comprising an inner active region having a fast inherent energy characteristic immediately surrounded by a reflector of moderator material, and this reactor will be subsequently dealt with at length.

Curve 2 of FIG. 3 and curve 2' of FIG. 4 represent a family of reactors, as indicated in FIG. 2, but with the reflector 7 completely omitted. Points D, E and F on curve 2 of FIG. 3, and corresponding points D', E' and F' on curve 2, of FIG. 4, represent three individual reactors (reactors D, E and F) the radial thickness T of whose slow regions 2 equals 15, 20, and 25 cm., respectively. Curve 3 of FIG. 3 and curve 3' of FIG. 4 represent a family of reactors, as indicated in FIG. 2, with a constant moderator reflector thickness $t$ of 30 cm. Points B and C on curve 3 of FIG. 3, and corresponding points B' and C' on curve 3' of FIG. 4, represent two individual reactors (reactors B and C) the radial thickness T of whose slow regions 2 equals 5 and 10 cm., respectively. In curves 2 and 3 of FIG. 3, the radius of the fast region 1 and the fissionable material content of the fast region are plotted as ordinates against the thickness T of the slow region 2 as abscissa. In FIG. 4, the percent of fast fissions for the reactor, as a whole, is plotted as ordinate against the fissionable material requirement for the reactor, as a whole (fast region and slow region), as abscissa. Since in the families of reactors represented by curves 2' and 3', only a relatively small percentage of fissions will be caused by intermediate energy neutrons, the percentage of slow fissions can be considered to be approximately one hundred minus the plotted percentage of fast fissions.

In the case of both families of reactors represented by curves 2, 2' and 3, 3', one can, of course, go from one extreme to the other, that is from an active portion consisting solely of the fast region 1 (zero radial thickness T of slow region 2) to an active portion consisting solely of the slow region 2 (zero radius R of fast region 1). As indicated by curves 2 and 3 of FIG. 3, as the thickness T of the slow region 2 is increased, the required radius R of the fast region 1 decreases sharply and approximately linearly. The fissionable material content of the fast region 1, being proportional to the third power of the radius R, decreases with increasing thickness T of the slow region very rapidly at low values of T and less rapidly at the higher values of T. Thus, in the case of curve 2, it is seen that the provision of only 5 cm. of slow region 2 with a fissionable material content of 7.33 kg. effects a reduction in the fissionable material content of the fast region 1 from 900 kg. to 460 kg., and in the case of curve 3, the insertion between the fast region 1 and the moderator reflector 7 of only 5 cm. of slow region 2 having a fissionable material content of 2 kg. effects a reduction in the fissionable material content of the fast region 1 from 200 to 57.5 kg. This strikingly illustrates the very marked advantage in respect to reduction of the overall fissionable material requirements which may be obtained by surrounding a fast active region with even a relatively small slow active region.

For comparison, the previously described research reactor A is plotted on FIGS. 3 and 4 as points A, and A', respectively. By comparison with point D on curve 2 of FIG. 3, the cost of including the black absorber 8 of FIG. 2 in an increase in overall fissionable material requirement can readily be perceived. And by comparison with point D' on curve 2' of FIG. 4, the effect of the black absorber in increasing the percent fast fissions and decreasing the percent slow fissions can be seen.

Generalizing, therefore, it is apparent that for both families of reactors represented by curves 2, 2' and 3, 3', as the thickness T of the slow region 2 is increased, the radius and the fissionable material content of the fast region 1 decrease and the overall fissionable material content of the reactor, as a whole, decreases. It is also evident that as the thickness T of the slow region 2 is increased, the percent fast fissions decreases and the percent slow fissions increases. Accordingly, the overall fissionable material requirement of the reactor, as a whole, can be considered as depending upon the relative percent of fast fissions and slow fissions, increasing with the percent fast fissions. This relationship is indicated in FIG. 4 wherein it can be seen that overall fissionable material requirement of the reactor, as a whole, can be drastically reduced by a relatively small decrease in the percent fast fissions.

Reactors B and C, represented by the points B, B' and C, C', respectively, on FIGS. 3 and 4 lie in regions of particular interest for high power reactors producing additional fissionable material or other desirable material by the absorption of excess neutrons. It will be understood that the reactors could be surrounded by a blanket of fertile material or other material which would evolve the more particularly desired material upon the absorption of a neutron. Values derived from the curves of FIGS.

3 and 4 for these two reactors are summarized below, as Examples II and III:

|  | Example II (reactor B) | Example III (reactor C) |
| --- | --- | --- |
| Radius R of fast region 1_____cm__ | 33.8 | 18.7 |
| Thickness T of slow region 2_____cm__ | 5.0 | 10.0 |
| Thickness t of moderator reflector 7_____cm__ | 30.0 | 30.0 |
| Fissionable material in fast region 1_____kg__ | 57.5 | 9.8 |
| Fissionable material in slow region 2_____kg__ | 2.0 | 1.8 |
| Total amount of fissionable material_____kg__ | 59.5 | 11.6 |
| Percent fast fissions_____percent__ | 46.6 | 15 |

FIG. 5 shows the spatial distribution of the fast and slow neutron flux for reactor B. Curves 9 and 10 are plots of the fast and slow flux, respectively, on an identical arbitrary scale as ordinate against the radius $r$ from the center of the reactor as abscissa. FIG. 6 shows the spatial distribution of the fast and slow neutron flux for reactor C, curves 11 and 12 being plots of the fast and slow flux, respectively, on an identical arbitrary scale as ordinate against the radius $r$ from the center of the reactor abscissa. As can be seen from curves 9 and 11, the fast flux has a maximum value at the center of these reactors and drops off gradually with increasing radius until the slow region 2 is reached at which point it begins to decrease more sharply due to the moderating properties of region 2. As can be seen from curves 10 and 12, the slow flux has a maximum in the moderator reflector 7 at a point between the slow region-reflector interface and the center of the reflector. The slow flux drops off continuously on both sides of its maximum, and with decreasing radius, it becomes zero at the interface between the fast region and slow region as a result of the black absorber 8 positioned at that point.

FIG. 7 shows the spatial distribution of fast fissions per unit volume and slow fissions per unit volume for reactor C. Curve 13 is a plot on an arbitrary scale of fast fissions per unit volume against the radius $r$ from the center of the reactor, and curve 14 is a plot on the same arbitrary scale of slow fissions per unit volume, in both cases against the distance $r$ from the center of the reactor. There is, of course, a proportional relationship over the entire active portion of the reactor between the slow flux curve 12 of FIG. 6 and the slow fission density curve 14 of FIG. 7. There is also a proportional relationship over the entire active portion between the fast flux curve 11 of FIG. 6 and the fast fission density curve 13 of FIG. 7, the proportionality constant differing, however, in the fast and slow regions of the active portion, and accounting for the discontinuity of curve 13 which occurs at the interface between the fast and slow regions. It will be apparent from the slow fission density curve 14 of FIG. 7 that the power density progressively increases from the inner surface to the outer surface of the slow region 2. Curve 14 could be flattened somewhat, if desired, by splitting the slow region 2 into a plurality of sub-regions along the radius, the moderator atom to fissionable atom ratio for the various sub-regions progressively increasing with the radius.

All of the specific reactors considered in the foregoing have had the same composition of fast region 1, that is, a composition consisting of bismuth and plutonium-239 in the ratio of 29 bismuth atoms per plutonium-239 atom. The inherent goodness of any given neutron reactive composition from the standpoint of its ability to maintain a chain reaction of neutron induced fission, including its inherent tendency to minimize leakage when employed in an actual reactor of finite size, may be expressed in terms of a characteristic constant known as the Buckling B of the composition. The above discussed fast region consisting of 29 bismuth atoms per plutonium-239 atom, for example, has a Buckling B of 0.037. FIGS. 8 and 9 illustrate the savings in critical radius of the fast region which are effected when the principles of the invention are applied to fast regions having different Bucklings B.

Curve 15 of FIG. 8 is a plot of the critical radius R of a bare fast region versus the Buckling B of the fast region. Curve 16 of FIG. 8 is a plot of the critical radius R of a fast region, when successively surrounded by a black boron absorber and a beryllium moderator reflector of 30 cm. radial thickness $t$, versus the Buckling B of the fast region. Curve 17 of FIG. 8 is a plot of the saving S in critical radius effected by employing the absorber and moderator reflector, that is, curve 17 is simply a plot of the difference between curves 15 and 16. As previously indicated, the critical radius of the fast region is markedly reduced by the addition of the absorber and moderator reflector in accordance with the principles of this invention. The curves of FIG. 8 further disclose that the reduction in critical radius which is effected becomes more marked as fast regions having progressively lower Bucklings B are employed.

In FIG. 9, curve 15 of FIG. 8 is repeated. Curve 18 of FIG. 9 is a plot of the critical radius R of a fast region, when successively surrounded by a black boron absorber and the slow region 2 of FIG. 2 (2000 Be: 1 U-233) having a radial thickness T of 10 cm., versus the Buckling B of the fast region. Curve 19 is a plot of the saving S in critical radius effected by employing the absorber and slow region, that is, the difference between curves 15 and 18. In this case, also, it will be noted that the saving S in critical radius obtained by adding the absorber and slow region, in accordance with the principles of the invention, becomes progressively greater as fast regions having progressively lower Bucklings B are employed.

In FIGS. 10 to 15, there is shown in detail a reactor wherein the principles of the present invention are applied to a high power breeding reactor of the type disclosed and claimed in U.S. patent application Serial No. 319,642 for Neutronic Reactor, filed November 10, 1952, in the names of John R. Menke and Harry Soodak, now abandoned.

Referring now particularly to FIG. 10, reference numeral 1' designates a spherical active portion having a fast inherent energy characteristic, and consisting in its entirety of fissionable atoms, non-fertile diluent atoms, and perhaps a proportionately small number of fertile diluent atoms. In accordance with the principles of the invention covered by the aforesaid application Serial No. 319,642, the ratio of diluent atoms to fissionable atoms in the active portion is high, preferably in the range between ten and forty, and the ratio of fertile atoms to fissionable atoms is low and preferably zero. In order to provide a fast inherent energy characteristic for the active portion 1', the active portion is maintained essentially free of moderator atoms. In accordance with the principles of the present invention, immediately surrounding the active portion 1', there is provided a spherical reflector 7 formed of a neutron moderator, such as beryllium, or graphite. Surrounding both the active portion 1' and the reflector 7 is a generally spherical breeder-reflector portion 41 formed, for example, of thorium or normal uranium, or other composition containing a high concentration of fertile atoms.

For control of the reactor, control rods 4 containing a slow neutron absorber are provided, the rods 4 being actuated by any conventional means such as rack and pinion 5. It will be understood, as hereinafter described in detail, that rods 4 are withdrawn to increase the reproduction factor and are inserted to decrease the reproduction factor.

While in FIG. 10 the active portion 1', reflector 7, and breeder reflector portion 41 are illustrated as generally spherical in form, it will be understood that other shapes, such as right circular cylinders or rectangular parallelepipeds, may be employed. The spherical structure illustrated requires the smallest critical mass of fissionable material and is therefore preferred.

As indicated in FIG. 10, the entire reactor structure is enclosed within, and supported by, a concrete vault or radiation shield 3 of any suitable material, such as concrete, adapted to absorb biologically harmful emanations such as neutrons, and alpha, beta and gamma rays. This vault 3 affords support for the moderator reflector 7 and enclosed active portion 1' by means of the bolts 40.

As will be more fully described hereinafter, a certain amount of diluent material is required in the active portion 1' as coolant, as protective cladding for the fissionable material, and as structural material. Additional diluent material over and above that required for these purposes is introduced into the active portion in intimate relationship with the fissionable material, that is, purposely added excess diluent material and fissionable material are present in the form of an intimate mixture or alloy. There are certain general criteria governing the choice of all such diluent material or materials which may be employed. It will be apparent that in order to maintain the inherent characteristic energy level of the active portion 1' in the fast range, the diluent material should be relatively ineffective as regards slowing down neutrons, this becoming more important at the higher dilutions. This means that the diluent material must be chosen from those materials having a high atomic number, at least above 10, and preferably substantially higher.

Also, in order to maintain the multiplication factor $(k)$ as high as possible and to minimize parasitic absorption of neutrons, the non-fertile diluent material must have a low neutron absorption cross section. Preferably, the fast neutron absorption cross section of the non-fertile diluent material is as low as about 0.005 barn per atom, and, in general, it should not exceed about 0.02 barn per atom, particularly at the higher values of over-all dilution. However, at the lower values of over-all dilution, say between five and ten, non-fertile diluent materials having fast neutron absorption cross sections of as much as 0.03 barn per atom may be employed.

In addition, of course, the higher the coefficients of thermal conductivity and heat capacity of the diluent material the better from the standpoints of heat transfer and temperature stability of the reactor. Preferably, therefore, the diluent material or materials are chosen from the metallic group of elements.

Examples of non-fertile materials which meet all of the above set forth general criteria and, therefore, are satisfactory as diluent materials are iron, lead, bismuth, sodium, potassium, aluminum, manganese, magnesium, zirconium, vanadium, and barium.

It will, of course, be appreciated that in addition to the above set forth general criteria applicable to the non-fertile diluent materials, special criteria are imposed by the particular purpose for which a given diluent material is employed in the reactor. Obviously, the diluent material which functions as the fluid coolant should have a relatively low melting point and a relatively high boiling point. Thus, sodium, potassium, bismuth, lead, and alloys of these, are particularly well suited for this purpose. Diluent material which function as structural material, or as protective cladding, or which is to form an intimate solid mixture with the fissionable material, should have good structural strength and a relatively high melting point. Iron is a particularly good diluent material to use for these latter purposes.

Referring next to FIGS. 11 and 12, the reactor diagrammatically illustrated in FIG. 10 is shown in greater detail, together with an associated coolant system adapted to absorb heat developed by the nuclear fission chain reaction, and to convey such heat from the reactor to an external point where it may be used by employing known techniques for industrial heating purposes or for the production of power.

As indicated, the active portion 1' contains a plurality of flat upstanding circular reactive plates 9 containing fissionable material. The fissionable material is present in the form of a solid mixture or alloy of fissionable material and non-fertile diluent material chosen from the class of materials previously described as satisfactory for this purpose. Preferably, the fissionable material is present as a mixture or alloy of iron and either Pu-239, U-233, or U-235, the fissionable material being preferably highly diluted with the iron. Although it is preferable, as previously described, that the active portion contain no fertile material, any small amount of fertile material which is present in the active portion is also included in this fissionable material containing mixture or alloy. The reactive plates 9 may be about 1 to 3 millimeters in thickness, for example.

The reactive plates 9 are enclosed on all sides by a metal jacket or cladding of a suitable non-fertile diluent material, such as iron or steel, in intimate thermal contact with the fissionable material containing mixture, in order to protect the fissionable material from the action of the associated coolant. This cladding material may have a thickness of about ¼ millimeter, for example.

Instead of being in the form of plates 9, the reactive mixture may be in the form of rods or other geometrical shapes, and these shaped fuel elements may be either internally or externally cooled. The shape makes little difference, but a high ratio of surface area to volume is effective and desirable from the cooling standpoint inasmuch as a large surface area for a given volume provides not only better contact for the coolant and better heat dissipation, but also reduces internal temperature and thermal stress. Whatever may be the form of the fuel elements, therefore, it is desirable to maintain their thickness small and to employ them in large numbers.

The plates 9 are supported, as hereinafter described, on suitable iron or steel rods 11, and are arranged in upright position and spaced apart from each other horizontally from about 1.5 to 3 millimeters, for example, so as to afford passageways for coolant therebetween. The plates 9 are circular discs in form, with progressively smaller diameters so that, when assembled, they provide a spherical core of neutron reactive composition.

As will be clearly seen in FIG. 13 each plate 9 is provided with a plurality of key shaped holes or openings 12, the openings in the respective plates being aligned to accommodate reception of support rods 11, one of which is shown in FIGS. 14 and 15. Each rod 11 is formed with a plurality of spaced lugs 13 which are disposed downwardly as the rod is inserted through the openings 12 in the plates 9. The rod 11 is then rotated so that the lugs 13 are disposed upwardly, as best seen in FIG. 11, so that the lugs afford spacers for the purpose of maintaining the plates 9 in proper spaced relationship. It will be understood that each rod 11 is supported at its ends in complementary openings passing through the moderator reflector 7 and breeder reflector portion 41, at least one end of each rod being provided with an enlarged portion 14 functioning as a counterweight to maintain the rod 11 in the position illustrated in FIG. 11 in which the lugs 13 are disposed upwardly to space the plates 9.

Referring again to FIGS. 11 and 12, in accordance with the principles of the present invention, active portion 1' is surrounded by a thermal neutron reflector 7 in the form of a hollow spherical solid shell of any suitable moderator material, such as beryllium, graphite, or beryllium oxide, the moderator reflector thus forming an enclosure for the active portion and its associated coolant. The effect of the moderator reflector 7 is to moderate high energy leakage neutrons to thermal energy and reflect a portion of these back into the fast active portion 1'. Thus, although the active portion 1' operates for the most part on neutrons in the fast or upper intermediate energy range, a substantial number of slow neutron induced fissions will occur therein, and particularly in an outer peripheral zone thereof. As previously brought out in the discussion of FIGS. 1 and 2, this circumstance results in many advantages, chief among which are: (1) the required radius of active portion 1' and its fissionable material content are reduced; (2) the reactor is inherently less dangerous; and (3) slow neutron absorber type control may be employed. The thickness of the moderator reflector 7 will determine the percent of all fissions which are induced by slow neutrons, and will therefore determine the extent to which the above noted advantages are realized. Sufficient slow neutron fissions take place to permit use of absorber type control with a reflector thickness as small as about three cm. On the other hand, at reflector thickness above about thirty cm., further increases in reflector thickness produce little in the way of increased slow neutron fissions. Accordingly, reflector thicknesses in the range between about three and thirty are preferred.

A solid generally spherical breeder-reflector portion 41 surrounds the moderator reflector 7 and is spaced therefrom somewhat, thus providing a spherical cooling annulus 30 through which coolant flows, as will hereinafter be described. As previously indicated, the breeder-reflector portion 41 is composed predominately, at least, of fertile material. Natural uranium, for example, is a convenient material from which the breeder-reflector portion may be fabricated, although thorium or pure uranium-238 would be entirely satisfactory. The inner spherical surface of the breeder-reflector portion 41 also is preferably coated with about ¼ mm. thickness of cladding material, such as iron, in order to protect the breeder-reflector material from the coolant. The thickness of the breeder-reflector portion 41 is not at all critical, and may, for example, range from 5 cm. up to 50 cm. or more.

It will be appreciated that a certain amount of heat will be generated in the breeder-reflector portion 41, particularly in the inner region thereof. If the breeder-reflector portion is not too thick, or if the operating power level of the reactor is not too high, the generated heat may be satisfactorily removed by the flow of coolant along its inner surface through the cooling annulus 30, as shown. However, if in a particular design, sufficient heat cannot be removed by the illustrated construction, it may be necessary to provide coolant passageways in the body of the breeder-reflector portion, itself, or to utilize a cooled spaced plate arrangement similar to that of the active portion 1'.

The liquid metal coolant is chosen from the class of materials previously described as satisfactory for this purpose. Bismuth, sodium, potassium, and lead, and alloys of these, make highly satisfactory coolants, a bismuth-lead eutectic being preferred. A circulation rate which provides a linear flow of the order of from 1 to 20 meters per second along the surface of the plates 9 ordinarily will provide a satisfactory rate of heat removal. In order to circulate the coolant, an inlet header 31 is provided from which a plurality of horizontal pipes 32 extend through the breeder-reflector portion 41 and moderator reflector 7. In order to effect better distribution of the coolant, the pipes 32 preferably discharge respectively between adjacent plates 9. A discharge header 33 is also provided and it communicates with the opposite end of the respective channels formed between adjacent plates 9 by way of a plurality of corresponding horizontal pipes 34. The inlet header and discharge header are also connected to the cooling annulus 30 by inlet and outlet pipes 35 and 36, respectively, which extend through the breeder-reflector portion 41. The coolant is circulated by a suitable pump (not shown) connected in a closed system with the headers, any suitable heat exchanger (not shown) being interposed to extract the generated heat for heating or power purposes.

The before-mentioned slow neutron absorber containing control rods 4 extend through the breeder-reflector portion 41 and moderator reflector 7 and part way into the active portion 1' through suitable wells or tubes 37 preferably formed of steel. When fully inserted, control rods 4 absorb slow neutrons present in the moderator reflector 7, which neutrons would otherwise diffuse into, and produce slow neutron fissions in, the outer peripheral region of the fast active portion 1', and they also directly absorb slow neutrons present in the outer peripheral region of the active portion, which neutrons would otherwise produce slow neutron fissions therein. It will be appreciated, therefore, that withdrawal of the control rods tends to increase the reproduction factor ($r$) and insertion thereof tends to decrease the reproduction factor ($r$). (The reproduction factor ($r$) is referred to by Goodman, vol. 1, page 113, as the effective multiplication constant, $k_{eff}$. When it has a value above unity, the power level of the reactor increases, and when it has a value below unity, the power level decreases.) At any given time during normal operation of the reactor, there will be a unique position of the control rods at which the reproduction factor ($r$) of the reactor is just equal to unity and at which the power level of the reactor will remain constant. The power level of the reactor may be decreased or increased from this constant value by temporarily moving the control rods inwardly or outwardly, respectively, from the aforesaid unique position until the new desired power level is reached, at which time the power level is held constant by returning the rods to their unique position whereat the reproduction factor is just equal to unity. The power level may thus be regulated, and it may be monitored by any conventional means.

It should be stressed at this point that the actual amount of fissionable material contained in the active portion is not really critical so long as the amount provided exceeds the critical mass. It is only necessary to provide an amount somewhat greater than the theoretically and/or experimentally indicated critical mass, this excess, whatever its amount, being effectively cancelled out or "held" by the control mechanism. Care must be taken, of course, to see that the control rods 4, or equivalent slow neutron absorber, are present in their fully inserted position in the reactor as its construction nears completion. The initial start-up procedure then is to gradually withdraw one or more of the control rods until the reproduction factor ($r$) increases to unity. The reactor power level can then be controlled by manipulation of the control rods, as described above, about the position whereat the reproduction factor equals unity. As the fissionable material in the active portion progressively gets used up, it will be found necessary to withdraw the control rods correspondingly in order to maintain the reproduction factor at unity. Ultimately, of course, the total amount of fissionable material available in the active portion, even with the control rods fully withdrawn, will become less than the critical mass. At such time, the reactor will be dismantled and its fissionable material and fertile material recovered by chemical processing.

The dimensions and amounts of fissionable material required in spherical reactors constructed along the lines disclosed in FIGS. 10 to 15 are presented in the following examples:

EXAMPE IV

Composition of action portion 1':
  1 atom Pu-239.
  14 atoms bismuth as coolant.
  10 atoms iron in part alloyed with Pu-239, and in part as structural and cladding material.
Composition of reflector 7: Beryllium.
Composition of breeder-reflector 41: Normal uranium.

|  | Radial thickness of reflector 7, cm. | Radial thickness of breeder-reflector 41, cm. | Active portion radius, cm. | Mass of fissionable material in active portion, kg. | Percent slow fissions |
| --- | --- | --- | --- | --- | --- |
| (IV-A) | 5 | 25 | 40 | 165 | 10 |
| (IV-B) | 3 | 27 | 42 | 190 | 3 |

Detailed design specifications and operating characteristics are given below for three additional examples of reactors constructed as indicated in FIGS. 10 to 15. All of these reactors are generally spherical reactors containing a spherical fast active portion surrounded successively by a 3 cm. moderator reflector of beryllium and a 27 cm. breeder-reflector of normal uranium. The active portion utilizes U-233 as the fissionable material, U-238 as fertile material (Examples VI and VII), a bismuth-lead eutectic as the coolant, and iron as structural, cladding, and U-233 diluting material.

|  | Ex. V | Ex. VI | Ex. VII |
|---|---|---|---|
| Relative number of fissionable atoms in active portion | 1.0 | 1.0 | 1.0 |
| Relative number of coolant atoms in active portion | 3.3 | 6.0 | 9.0 |
| Relative number of iron atoms in active portion | 8.0 | 14.0 | 20.0 |
| Relative number of fertile atoms in active portion | 0.0 | 1.0 | 2.0 |
| Dilution | 11.3 | 21.0 | 31.0 |
| Mass of fissionable material in active portion (kg.) | 50 | 100 | 160 |
| Radius of active portion (cm.) | 20 | 30 | 40 |
| Coolant inlet temp. (°C.) | 200 | 200 | 200 |
| Coolant outlet temp. (°C.) | 420 | 475 | 510 |
| Max. temperature in reactor (°C.) | 715 | 715 | 715 |
| Thickness of reactive plates, including cladding (mm.) | 3.0 | 3.0 | 3.0 |
| Thickness of cladding on plates (mm.) | 0.25 | 0.25 | 0.25 |
| Spacing between plates (mm.) | 3.0 | 3.0 | 3.0 |
| Coolant velocity (meters/sec.) | 3.0 | 3.0 | 3.0 |
| Heat output (kw.) | 36,500 | 110,000 | 212,800 |
| Specific power (kw./kg.) | 730 | 1,100 | 1,330 |
| Breeding gain | 0.36 | 0.27 | 0.19 |
| Breeding gain × specific power | 255 | 297 | 252 |
| Doubling time (yrs.) | 10.8 | 9.2 | 10.9 |
| Normal uranium in breeder-reflector (tons) | 9.5 | 15 | 22 |
| Percent slow fissions | 3 | 3 | 3 |

If plutonium-239 is substituted for U-233 as the fissionable material in the above three reactors, the design values and operating characteristics are substantially identical except for the values of breeding gain, which are higher, and doubling time which are lower. This results from the fact that at the average effective neutron energies involved in these reactors, the average number of fission neutrons produced per neutron absorbed in plutonium-239 is substantially higher than the average number of fission neutrons produced per neutron absorbed in U-233. Thus, with this substitution the values of the doubling time in years for Examples V, VI and VII above, turn out to be 5.7, 4.4, and 4.1, respectively.

In the data given in all of the foregoing tables associated with the various examples, the rather minor favorable effect of fast fissions in the fertile material has been neglected. If this effect were taken into account, the indicated performance characteristics would be even better, e.g. the critical mass and the doubling time would be somewhat lower, and the specific power and the breeding gain would be somewhat higher.

In all of the above examples, the value given for the mass of fissionable material in the active portion is the calculated critical mass, that is, the mass of fissionable material which is just capable of sustaining a chain reaction, this being the data of most interest and usefulness to the reactor designer. Prior to actual construction, of course, the critical mass would preferably be determined precisely by means of the usual critical experiment, that is, by a step-wise assembly of a zero power test prototype of the reactor which duplicates the reactor from a nuclear physics standpoint but omits all cooling provisions and all other unessential engineering detail. Such a critical experiment and the experimental technique for determining the exact critical mass are explained in appendix 4 of Atomic Energy for Military Purposes, H. D. Smyth, Princeton University Press, Princeton, N.J., 1945, and on pages 181 to 186 of Goodman, vol. 1. As previously indicated, in order that the reactor, as actually constructed, may continue to run for the desired length of time prior to reprocessing, there is initially provided in the active portion an amount of fissionable material somewhat in excess of the indicated critical mass, the excess being initially cancelled out or "held" by the control mechanism. This excess amount of fissionable material actually employed is purely a matter of choice with the reactor designer; it may, for example, be five or ten percent of the indicated critical mass.

The reactors discussed above in connection with FIGS. 10 to 15 are particularly adapted to the problem of converting fertile material to fissionable material, e.g. U-238 to Pu-239, by neutron absorption in the fertile material. It should be appreciated, however, that this problem is merely a special case of a broader one, namely, the conversion of any given original atom to a more particularly desired one by absorption of a neutron in the original atom. It will be apparent, therefore, that whenever the original, or starting, atom of such a conversion process has a relatively high fast neutron absorption cross section comparable to those of the fertile atoms (a few tenths of a barn), exactly the same considerations are involved as in the conversion of fertile atoms to fissionable atoms, and the reactor design disclosed in FIGS. 10 to 15 may be utilized in exactly the same manner and with equal advantages. For example, it might be desired to produce substantially quantities of the radioactive silver isotope of atomic weight 110 which emits both gamma and beta radiation with a fairly long half-life. This silver isotope may be produced by means of a reaction involving the absorption of a neutron in the naturally occurring silver isotope of atomic weight 109. Since the fast neutron absorption cross section of silver 109 is comparable to those of the fertile atoms, the above described reactors can be used for the large scale production of silver 110 simply by replacing the normal uranium in the breeder-reflector 41 with silver 109 and without other change in the indicated design values.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. A nuclear reactor having a core comprising two active regions, a first inner active region having a low ratio of moderator to fuel such that the majority of fissions in the region are caused by neutrons having energies greater than thermal, a second outer active region having a high ratio of moderator to fuel such that the majority of fissions in the region are caused by thermal neutrons, the first and second regions in combination having a $k$ effective not less than one and each region contributing a substantial amount to the $k$ effective of the reactor core but each region separately having a $k$ infinity greater than one but a $k$ effective less than one, the core having neutron absorber control means in the second active region.

2. The reactor of claim 1 wherein the majority of fissions in the inner active region are caused by fast neutrons.

3. The reactor of claim 1 wherein the majority of fissions in the inner active region are caused by neutrons of intermediate energies.

4. The reactor of claim 1 wherein the inner active region and the outer active region are separated by a thin layer of a material containing a slow neutron absorber interposed between said active portions.

References Cited in the file of this patent

UNITED STATES PATENTS

| 2,708,656 | Fermi et al. | May 17, 1955 |
| 2,743,225 | Ohlinger et al. | Apr. 24, 1956 |
| 2,743,226 | Newson | Apr. 24, 1956 |
| 2,815,319 | Snell | Dec. 3, 1957 |

(Other references on following page)

FOREIGN PATENTS

| | | |
|---|---|---|
| 648,293 | Great Britain | Jan. 3, 1951 |
| 688,821 | Great Britain | Mar. 18, 1953 |
| 688,823 | Great Britain | Mar. 18, 1953 |

OTHER REFERENCES

The Science and Engineering of Nuclear Power by Clark Goodman, vol. I, 1947. Addison-Wesley Press Cambridge, Mass., pp. 273–278.

KAPL–M–RE–7, "Multi-Group Calculations on the Fast Loading of the Variable Spectrum Reactor," by R. Ehrlich, Mar. 17, 1950, pp. 3–31.

U.S. Atomic Energy Commission, A.E.C.D. 3059, "An Enriched Homogeneous Nuclear Boiler," Los Alamos Scientific Library.

Nucleonics (September 1952), vol. 10, No. 9, p. 12 (Zinn).

Introduction to Nuclear Engineering, by Richard Stephenson, pub. by McGraw-Hill Book Co., N.Y. (1954), pp. 92–97.

Scientific American, December 1952, vol. 187, No. 6, pp. 58–60.